United States Patent
Langmatz et al.

(10) Patent No.: US 8,699,784 B2
(45) Date of Patent: Apr. 15, 2014

(54) INSPECTION RECIPE GENERATION AND INSPECTION BASED ON AN INSPECTION RECIPE

(75) Inventors: Eldad Langmatz, Haifa (IL); Shimon Koren, Haifa (IL); Menachem Regensburger, Shimshit (IL); Zehava Ben-Ezer, Moshav Balfuria (IL)

(73) Assignee: Camtek Ltd., Migdal Haemek (IL)

( * ) Notice: Subject to any disclaimer, the term of this patent is extended or adjusted under 35 U.S.C. 154(b) by 264 days.

(21) Appl. No.: 13/197,812

(22) Filed: Aug. 4, 2011

(65) Prior Publication Data

US 2012/0057773 A1    Mar. 8, 2012

Related U.S. Application Data

(60) Provisional application No. 61/372,109, filed on Aug. 10, 2010.

(51) Int. Cl.
*G06T 7/00*    (2006.01)

(52) U.S. Cl.
USPC .......................................... 382/145; 382/149

(58) Field of Classification Search
None
See application file for complete search history.

(56) References Cited

U.S. PATENT DOCUMENTS

| | | | |
|---|---|---|---|
| 6,913,861 B2 * | 7/2005 | Shishido et al. | 430/30 |
| 7,681,159 B2 * | 3/2010 | Matsuoka et al. | 716/113 |
| 2003/0174878 A1 * | 9/2003 | Levin et al. | 382/149 |
| 2007/0230770 A1 * | 10/2007 | Kulkarni et al. | 382/149 |
| 2009/0041332 A1 * | 2/2009 | Bhaskar et al. | 382/145 |
| 2009/0202139 A1 * | 8/2009 | Toyoda et al. | 382/145 |
| 2009/0290782 A1 * | 11/2009 | Regensburger | 382/145 |

* cited by examiner

*Primary Examiner* — Jon Chang
(74) *Attorney, Agent, or Firm* — Oren Reches

(57) ABSTRACT

System, computer readable medium and method. The system includes (i) a data obtaining module arranged to obtain data about at least one portion of an inspected article; and (ii) a processor arranged to perform at least one processing operation of the data out of: (a) processing the data to provide the inspection recipe; and (b) processing the data, while utilizing the inspection recipe, to detect defects; wherein the inspection recipe comprises multiple zones of multiple types of zones; wherein a zone of a first type of zones differs from a zone of a second type of zone.

33 Claims, 18 Drawing Sheets

| Reference sets 590 |
|---|
| Texture/pattern – super res image sample 1 591 |
| Texture/pattern – super res image sample N 593 |
| Radius (expected distribution info) 594 |
| Texture/pattern class ID 595 |
| Texture/pattern derived info (edge response distribution -amplitude & direction, gray level distribution, etc') 596 |
| 3D info (height/ complete model) 597 |

| Algorithm application and run time parameters 580 |
|---|
| Algorithm/run time set 1 581 |
| Algorithm/run time set 2 582 |
| Algorithm/run time set 3 583 |

| Illumination/ imaging modes 570 |
|---|
| Configuration 1 (physical detector "A" Set a) 571 |
| Configuration 2 (physical detector "A" Set b) 572 |
| Configuration N (physical detector "M" Set n) 579 |

Fig. 9

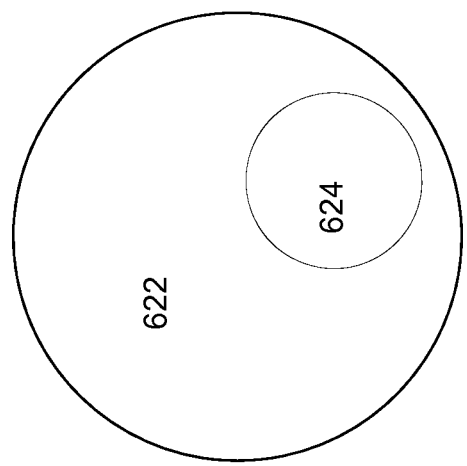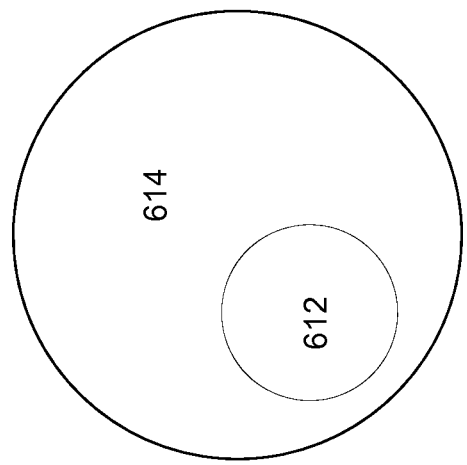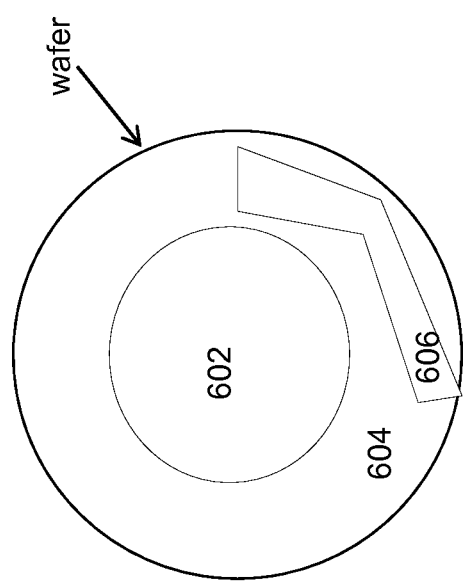
Fig. 10

Obtaining, by an inspection system, images of at least one portion of an inspected article; wherein the inspected article comprises multiple objects of a certain class. 1010

Processing the images to provide the inspection recipe, wherein the inspection recipe comprises a set of image obtaining zones and a set of algorithm zones. At least two different image obtaining zones differ from each other by at least one image obtaining conditions to be applied when obtaining images of the image obtaining zones. At least two algorithm zones differ from each other by a processing algorithm to be applied on images of the algorithm zones. The set of image obtaining zones may differ from the set of the algorithm zones. 1020

Processing the data about the at least one portion to provide for each class of objects out of multiple classes of objects, an object model representative of multiple objects of the class of objects. 1721

Processing the images to provide for each area out of at least two different areas of the inspected article, an object model representative of the multiple objects of the certain class that are located within the area of the inspected article. 1722

Processing the data about the at least one portion of the inspected article to provide a model of the inspected article. The model of the inspected article may include macro information and local adaptation rules. 1723

Processing the images to provide a die model representative of the multiple dice. 1724

Generating multiple object models, wherein different object models are obtained by applying different combinations of rules. 1725

Applying different combinations of rules on same locations of the at least portion of the inspected article. 1726

Defining different zones of different types of zones based on the data; wherein the types of zones may include at least one of data collection zone and a data processing zone. Accordingly – a definition of zones can be done automatically – based on the different outcome of different data iterations. For example - if a first area (or defects of that area) is best viewed when applying a first combination of rules and a second area (or defects of that area) are best viewed when applying a second combination of rules then the first area can be defined as a zone in which the first combination of rules should be applied and the second area should be viewed as another zone in which the second combination of rules is applied. 1727

Defining the different zones based on a quality of data obtained at different locations of the at least portion of the inspected article. The quality of data can refer to the clarity in which defects can be seen (for example- shaper defect – surrounding contrast), whether the sensor is saturated or not, and the like. 1728

Defining the different zones based on differences between data obtained at different combinations of rules at different locations of the at least portion of the inspected article. 1729

INSPECTION RECIPE GENERATION AND INSPECTION BASED ON AN INSPECTION RECIPE

RELATED APPLICATIONS

This application claims priority from U.S. provisional patent 61/372,109 filing date Aug. 10, 2010 which is incorporated herein by reference.

BACKGROUND OF THE INVENTION

FIG. 1 depicts a prior art inspection process 100. The inspection process 100 includes a modeling stage 110 which is generally carried out during a setup of a system. The modeling stage 110 is followed by an inspection stage 120.

Stage 110 includes acquiring images 112 and creating a model 114 (based on the acquired images). The model has, for each pixel of the model, minimal gray level values, maximal gray level values and typical gray level values.

Stage 120 includes retrieving the model 124, acquiring images of an article 122, and comparing (126) images of the article to images retrieved from the model generated during setup. The comparison 126 is followed by a decision stage 128 (deciding whether defects exist) that may generate a list of defects.

FIG. 2 illustrates a prior art model creation process 130. During setup, a set of images are collected (132) from multiple dies. These dies are selected either randomly or by the user. These images are used to create (134) a "golden image" of a die, where the golden image is preferably assumed to have no defects. Each pixel of the "golden image" consists (136) of a typical gray level value ("Typ"), Minimal gray level value ("Min") and a Maximal Gray level value ("Max"). These three values may be used during inspection to determine the presence of defects while minimizing false defect detection.

SUMMARY

According to an embodiment of the invention a method is provided. The method may include: obtaining, by an data obtaining module, data about at least one portion of an inspected article; wherein the inspected article comprises at least one object of a certain class; and performing, by a processor, at least one processing operation of the data out of: (a) processing the data to provide the inspection recipe; (b) processing the data, while utilizing the inspection recipe, to detect defects; wherein the inspection recipe comprises an object model of the certain class; wherein the data collection rules comprise optical illumination rules and optical collection rules; wherein the object model comprises: the data representing values of pixels of the object (received from the sensing means); and at least one additional geometrical parameter selected out of at least: a shape of the object model; a size of the object model; a location of the object model; and an orientation of the object model.

According to an embodiment of the invention the method can be executed by one or more computers (or processors) that execute instructions stored in a non-transitory computer readable medium.

According to an embodiment of the invention a non-transitory computer readable medium is provided and may store instructions for: obtaining data about at least one portion of an inspected article; wherein the inspected article may include at least one object of a certain class; and performing at least one processing operation of the data out of: (a) processing the data to provide the inspection recipe; (b) processing the data, while utilizing the inspection recipe, to detect defects; wherein the inspection recipe may include an object model of the certain class; wherein the object model may include: the data representing values of pixels of the object (received from the sensing means); and at least one additional geometrical parameter selected out of at least: a shape of the object model; a size of the object model; a location of the object model; and an orientation of the object model.

According to an embodiment of the invention a system may provided and may include a data obtaining module and a processor; wherein data obtaining module is arranged to obtain data about at least one portion of an inspected article; wherein the inspected article may include at least one object of a certain class; and wherein the processor is arranged to perform at least one processing operation of the data out of: (a) processing the data to provide the inspection recipe; (b) processing the data, while utilizing the inspection recipe, to detect defects; wherein the object model may include: the data representing values of pixels of the object (received from the sensing means); and at least one additional geometrical parameter selected out of at least: a shape of the object model; a size of the object model; a location of the object model; and an orientation of the object model.

The inspection recipe can also include at least one combination of rules, each combination of rules comprises at least two rules out of data collection rules, data processing rules, and response rules relating to at least one response to at least one result of the processing.

The object model may include at least two additional parameters out of: an orientation of the object model; a spatial relationship between at least two objects of the certain class; a three dimensional image of an object of the certain class; and two dimensional image of an object of the certain class.

The method may include (and additionally or alternatively the computer readable medium can store instructions for) processing the data about the at least one portion to provide for each class of objects out of multiple classes of objects, an object model representative of multiple objects of the class of objects.

The system may be arranged to process the data about the at least one portion to provide for each class of objects out of multiple classes of objects, an object model representative of multiple objects of the class of objects.

The method may include (and additionally or alternatively the computer readable medium can store instructions for) processing the images to provide for each area out of at least two different areas of the inspected article, an object model representative of the multiple objects of the certain class that are located within the area of the inspected article.

The system may be arranged to process the images to provide for each area out of at least two different areas of the inspected article, an object model representative of the multiple objects of the certain class that are located within the area of the inspected article.

The at least portion of the inspected article may the inspected article in its entirety; wherein the method may include processing the data about the at least one portion of the inspected article to provide a model of the inspected article; wherein the model of the inspected article may include macro information and local adaptation rules. Macro information defines general data collection, data processing and/or response rules for the entire inspected object while local adaptation rules may provide local deviations to the macro information.

The inspected article may be a wafer that may include multiple dice, wherein each dice of the multiple dice may include multiple objects of the certain class; and wherein the method may include (and additionally or alternatively the computer readable medium can store instructions for) processing the images to provide a die model representative of the multiple dice.

The method may include (and additionally or alternatively the computer readable medium can store instructions for) obtaining the data by applying different combinations of rules.

The system can be arranged to obtain the data by applying different combinations of rules.

The method may include (and additionally or alternatively the computer readable medium can store instructions for) generating multiple object models, wherein different object models are obtained by applying different combinations of rules.

The system can be arranged to generate multiple object models, wherein different object models are obtained by applying different combinations of rules.

The obtaining of the data may include applying different combinations of rules on same locations of the at least portion of the inspected article.

The inspection recipe may define multiple zones of multiple types of zones; wherein at least one zone of a first type and at least one other zone of a second type of zones partially overlap; wherein the types of zones may include at least two out of a data collection zone, a data processing zone, and a response zone; wherein different data collection zones differ from each other by at least one data collection rule; wherein different data processing zones differ from each other by at least one data processing rule; and wherein different response zones differ from each other by at least one response rule.

The types of zones may include the data collection zone the data processing zone, and the response zone.

The types of zones may include the data collection zone and the data processing zone.

At least two data processing zones may differ from each other by a data processing rule that defines an object model to be utilized during the processing of the data.

The method may include (and additionally or alternatively the computer readable medium can store instructions for) obtaining the data about the at least one portion of the inspected article by performing multiple iterations of data obtaining that differ from each other by combination of rules applied during the multiple iterations; and defining different zones of different types of zones based on the data; wherein the types of zones may include at least one of data collection zone and a data processing zone.

The system can be arranged to obtain the data about the at least one portion of the inspected article by performing multiple iterations of data obtaining that differ from each other by combination of rules applied during the multiple iterations; and define different zones of different types of zones based on the data; wherein the types of zones may include at least one of data collection zone and a data processing zone.

The method may include (and additionally or alternatively the computer readable medium can store instructions for) defining the different zones based on a quality of data obtained at different locations of the at least portion of the inspected article.

The system can be arranged to define the different zones based on a quality of data obtained at different locations of the at least portion of the inspected article.

The method may include (and additionally or alternatively the computer readable medium can store instructions for) defining the different zones based on differences between data obtained at different combinations of rules at different locations of the at least portion of the inspected article.

The system can be arranged to define the different zones based on differences between data obtained at different combinations of rules at different locations of the at least portion of the inspected article According to an embodiment of the invention a method may be provided for generating or utilizing an inspection recipe, the method may include: obtaining, by an data obtaining module, data about at least one portion of an inspected article; wherein the inspected article may include at least one object of a certain class; and performing, by a processor, at least one processing operation of the data out of: (a) processing the data to provide the inspection recipe; (b) processing the data, while utilizing the inspection recipe, to detect defects; wherein the inspection recipe may include multiple zones of multiple types of zones; wherein at least one zone of a first type and at least one other zone of a second type of zones partially overlap; wherein the types of zones may include at least two out of a data collection zone, a data processing zone, and a response zone; wherein different data collection zones differ from each other by at least one data collection rule; wherein different data processing zones differ from each other by at least one data processing rule; and wherein different response zones differ from each other by at least one response rule. A response zone is a virtual zone that corresponds to locations of the object on which the same response rules should be applied. A response rule may define how to respond to a certain outcome of an inspection process. A data collection zone is a virtual zone that corresponds to locations of the object on which the same data collection rules are applied. A data processing zone is a virtual zone that corresponds to locations of the object on which the same data processing rules should be applied.

According to an embodiment of the invention the method can be executed by one or more computers (or processors) that execute instructions stored in a non-transitory computer readable medium.

According to an embodiment of the invention a non-transitory computer readable medium is provided and may store instructions for: obtaining, by an data obtaining module, data about at least one portion of an inspected article; wherein the inspected article may include at least one object of a certain class; and performing, by a processor, at least one processing operation of the data out of: (a) processing the data to provide the inspection recipe; (b) processing the data, while utilizing the inspection recipe, to detect defects; wherein at least one zone of a first type and at least one other zone of a second type of zones partially overlap; wherein the types of zones may include at least two out of a data collection zone, a data processing zone, and a response zone; wherein different data collection zones differ from each other by at least one data collection rule; wherein different data processing zones differ from each other by at least one data processing rule; and wherein different response zones differ from each other by at least one response rule.

According to an embodiment of the invention a system may provided and may include a data obtaining module and a processor; wherein data obtaining module is arranged to obtain data about at least one portion of an inspected article; wherein the inspected article may include at least one object of a certain class; and wherein the processor is arranged to perform at least one processing operation of the data out of: (a) processing the data to provide the inspection recipe; (b) processing the data, while utilizing the inspection recipe, to detect defects; wherein at least one zone of a first type and at least one other zone of a second type of zones partially overlap; wherein the types of zones may include at least two out of a data collection zone, a data processing zone, and a response zone; wherein different data collection zones differ from each other by at least one data collection rule; wherein different data processing zones differ from each other by at least one data processing rule; and wherein different response zones differ from each other by at least one response rule.

The types of zones may include the data collection zone the data processing zone, and the response zone.

The types of zones may include the data collection zone and the data processing zone.

At least two data processing zones may differ from each other by a data processing rule that defines an object model to be utilized during the processing of the data.

The method may include (and additionally or alternatively the computer readable medium can store instructions for): obtaining the data about the at least one portion of the inspected article by performing multiple iterations of data obtaining that differ from each other by combination of rules applied during the multiple iterations; and defining different zones of different types of zones based on the data; wherein the types of zones may include at least one of data collection zone and a data processing zone.

The system can be arranged to obtain the data about the at least one portion of the inspected article by performing multiple iterations of data obtaining that differ from each other by combination of rules applied during the multiple iterations; and define different zones of different types of zones based on the data; wherein the types of zones may include at least one of data collection zone and a data processing zone.

The method may include (and additionally or alternatively the computer readable medium can store instructions for) defining the different zones based on a quality of data obtained at different locations of the at least portion of the inspected article.

The system can be arranged to define the different zones based on a quality of data obtained at different locations of the at least portion of the inspected article.

The method may include (and additionally or alternatively the computer readable medium can store instructions for) defining the different zones based on differences between data obtained at different combinations of rules at different locations of the at least portion of the inspected article.

The system can be arranged to define the different zones based on differences between data obtained at different combinations of rules at different locations of the at least portion of the inspected article.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 9 illustrates a multi-level model according to an embodiment of the invention;

FIG. 10 illustrates a set of image obtaining zones, a set of the data processing zones and a set of object model zones according to an embodiment of the invention;

FIGS. 14-19 illustrate methods according to various embodiments of the invention.

DETAILED DESCRIPTION OF THE DRAWINGS

Figure 1:
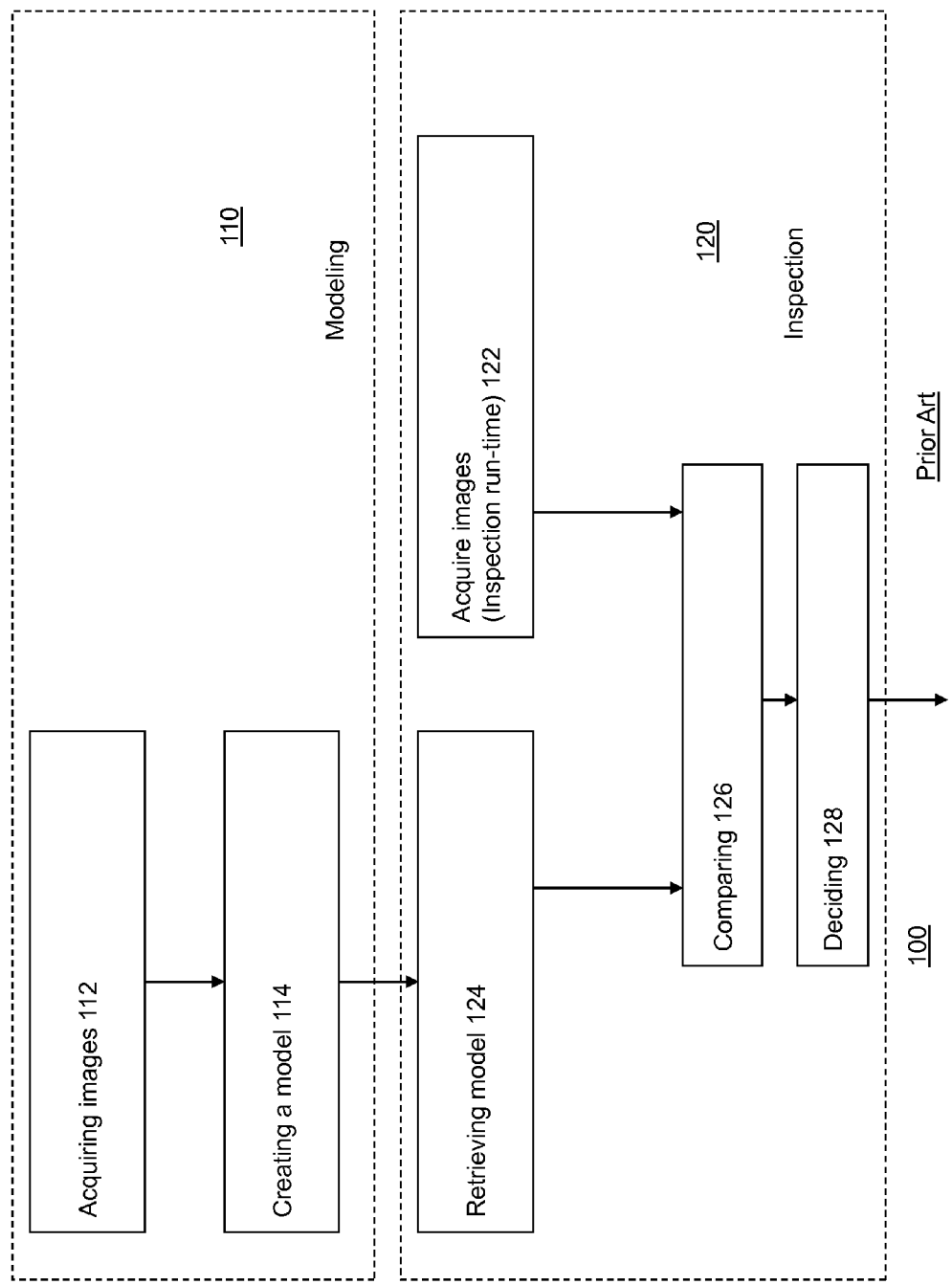
FIG. 1 illustrates a prior art inspection process.
Figure 2:
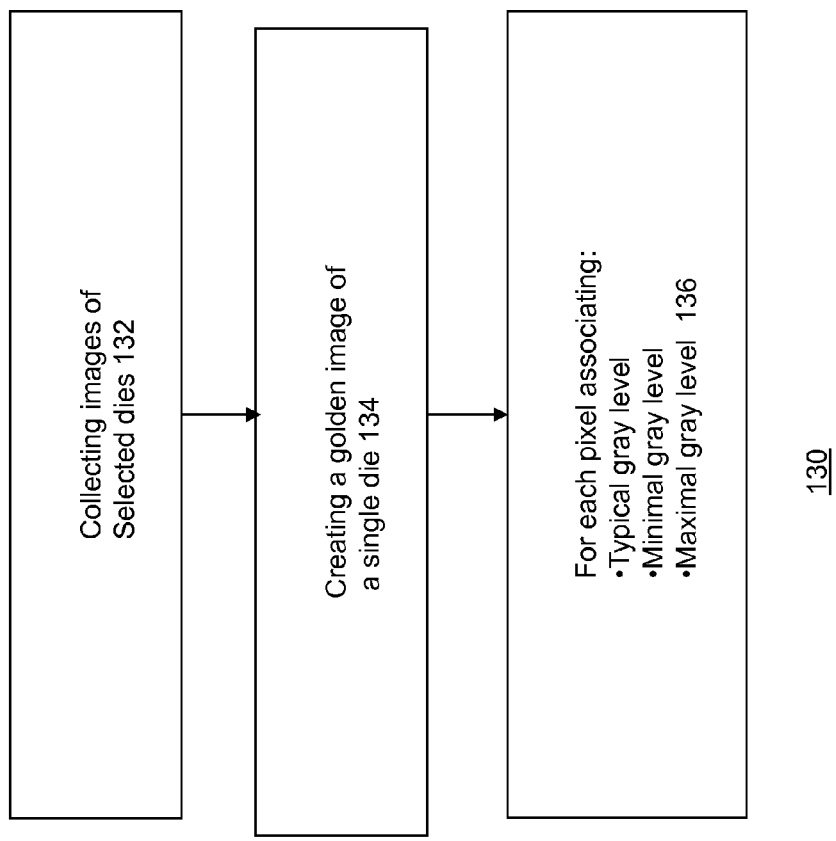
FIG. 2 illustrates a prior art modeling process.

The foregoing and other objects, features, and advantages of the present invention will become more apparent from the following detailed description when taken in conjunction with the accompanying drawings. In the drawings, similar reference characters denote similar elements throughout the different views.

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

The following description refers to a semiconductor wafer although the methods and systems can be applied mutatis mutandis to other inspected articles such as but not limited to Printed Circuit Boards, solar panels, Flat Panel Display (FPD) and the like.

The term inspection recipe means information that may affect the manner in which an inspection process should be executed. An inspection recipe can determine how images are acquired, how acquired images should be processed, and the like. An inspection recipe can include reference information (such as one or more models) that should be compared to information obtained from an article (or a portion of the article). It is noted that the inspection recipe can determine the entire inspection process or a portion of the inspection process.

According to an embodiment of the invention there is provided a method that facilitates special treatment of selected objects, by associating specific parameters describing its two dimensional or three dimensional (2D or 3D) features such as texture, scale, locations and variation of these parameters, to improve detection of object-related defects. Such objects may include solder bumps, gold bumps, conductors, vias and the like.

It is noted that the term structure can have its common interpretation but can, additionally or alternatively may be used to describing a region which has some common repetitive pattern\structural content. Texture in this case is a property of a patch of image textures may be more structured (regular patterns—like a grid or brick pattern) or stochastic (like ocean waves or sand). It is generated by some description of the patch. Generally statistical information of various types about gray levels distribution, edge directions and strength.

The term scale can mean what is the common size of the model. If the objects are of the same shape but vary in scaling factor (global or in specific directions) this should be indicated by their scale value.

The term class refers to an outcome of classification process. An object of a certain class can have a certain shape, size or attribute that are shared (either have the same value of have an allowable changes) between objects of the same class. For example, a bump can be a class but bumps that have different attributes can be further classified to different classes.

According to an embodiment of the invention there is provided a method that may provide models that may include additional parameters in addition to typical, minimal and maximum pixel values. Such additional parameters can include geometric features, predefined/learned/trained texture classes, gradient (amplitude and direction of several orders) information, etc.

According to an embodiment of the invention there is provided a method that may provide multi-leveled references, such as for multiple simultaneous or sequential imaging methods, illumination and resolutions to optimize detection on varying patterns per customers' needs.

According to an embodiment of the invention there is provided a method that can include full-wafer modeling, thus enabling macro defect inspection (such as Copper Mechanical Polishing residues or scratches, material deposition non-uniformity and the like) as well as local adaptations of die models and object class models across the wafer. Local adaptations can include information about the overall gray pixel level of various areas of the wafer, a typical color set of various areas of the wafer and the like. For example, if a certain area of the wafer appears brighter than another area of the wafer this information should be taken into account when inspecting objects (or dice) at these areas.

According to an embodiment of the invention there is provided a method that may include various types of dynamic modification during inspection. Modifications may relate to imaging conditions, object class model characteristics, algorithm usage and run time parameters.

According to an embodiment of the invention there is provided a method that may include defining zoning schemes which enables optimization of model used, optimization of imaging scheme, and optimization of detection algorithms to meet specific detection needs, both off-line and during runtime.

Figure 3:
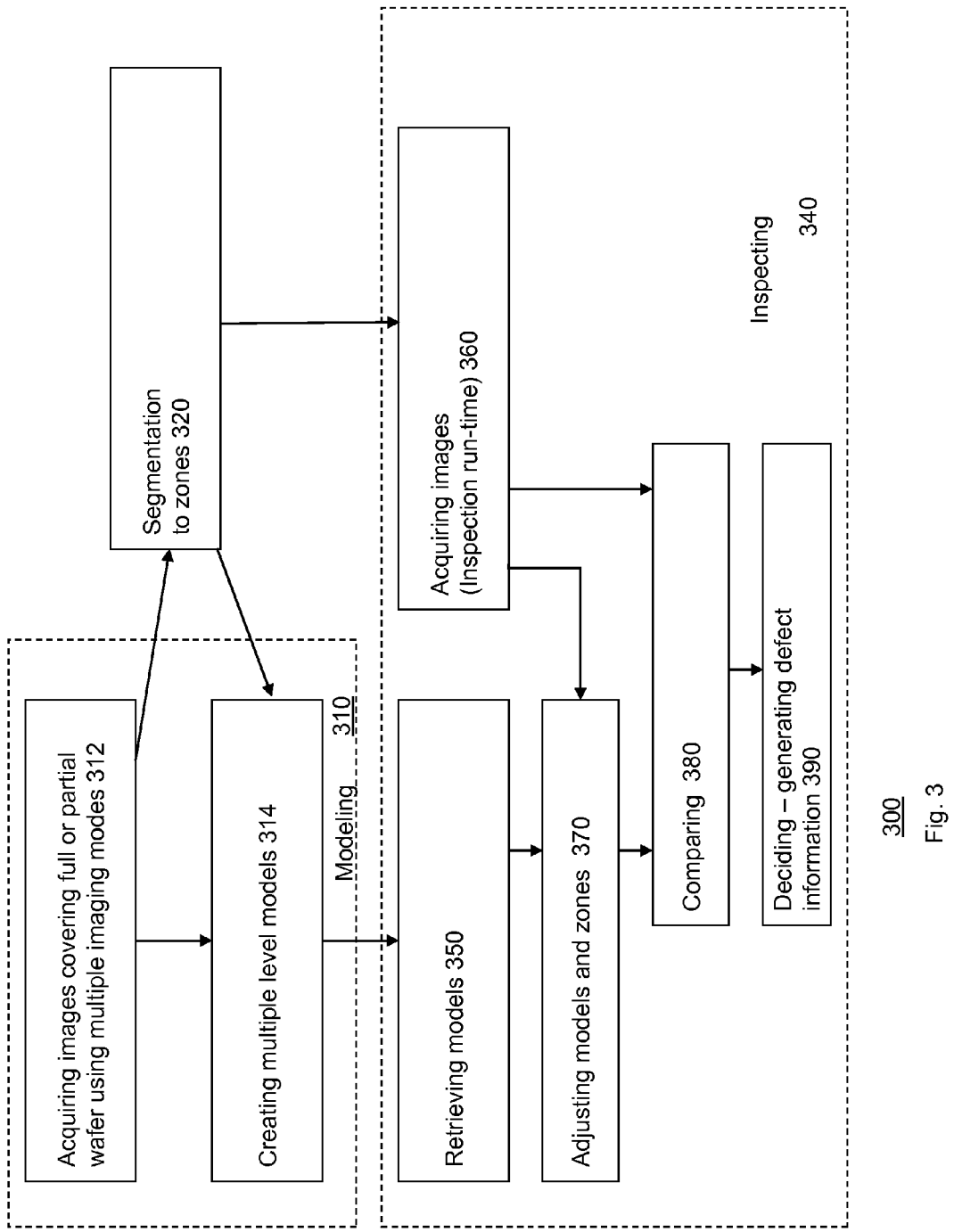
FIG. 3 illustrates a method for generating a model and for inspecting an article according to an embodiment of the invention.

FIG. 3 describes a method 300 according to an embodiment of the invention.

Method 300 includes modeling 310, segmenting to zones 320 and inspecting 340.

Figure 4:
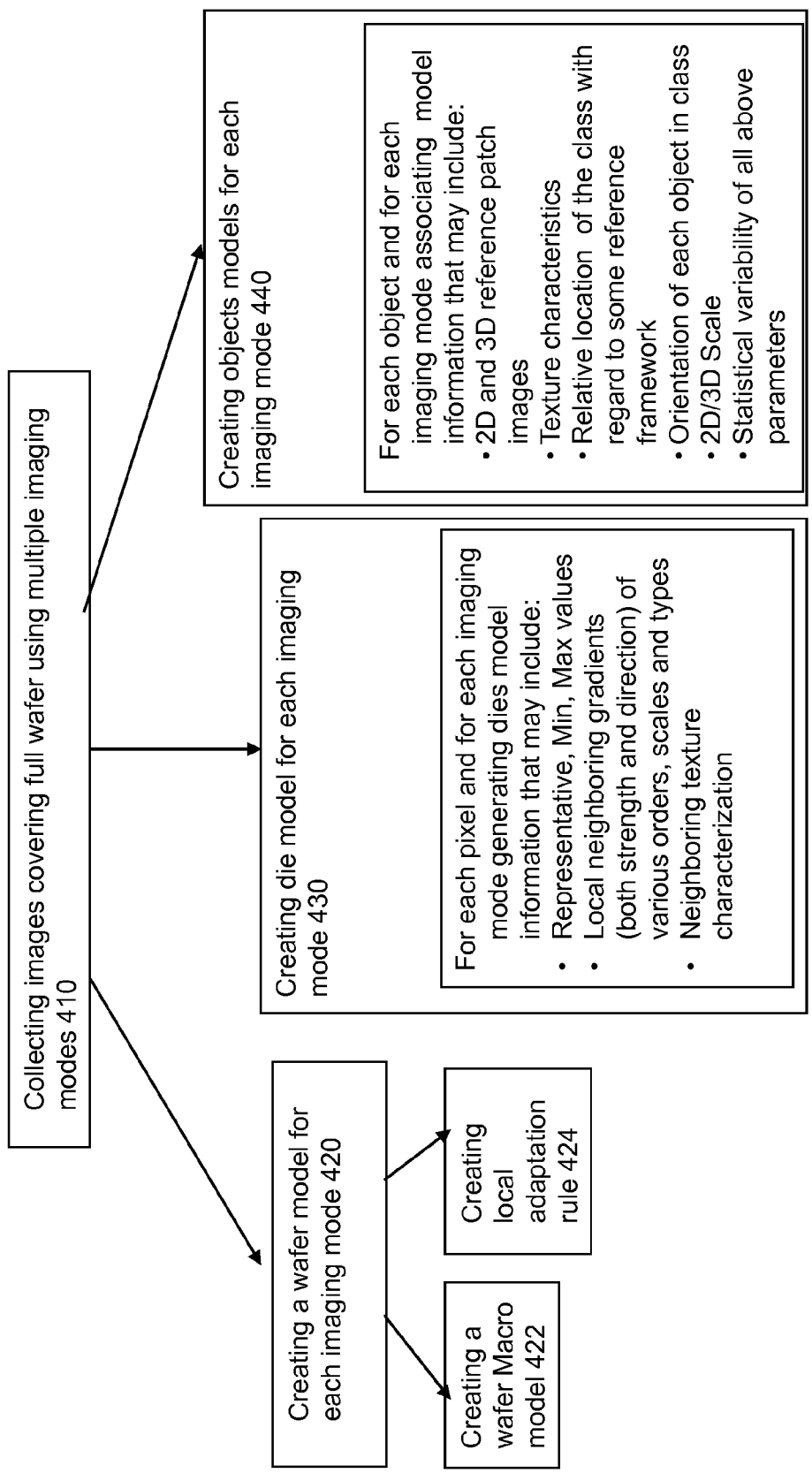
FIG. 4 illustrates a process of generating a wafer model, a die model and objects models according to an embodiment of the invention.
Figure 5:
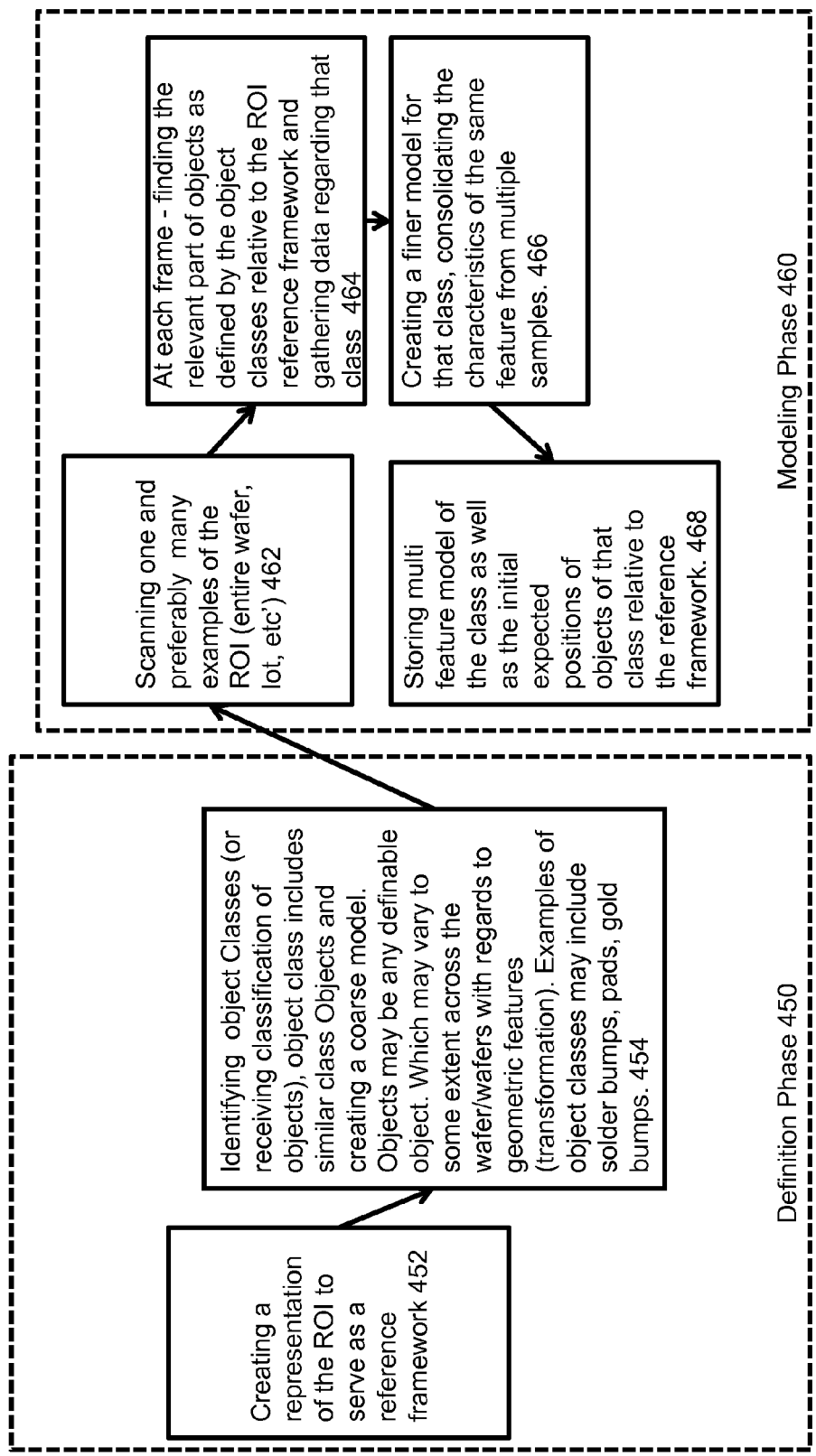
FIGS. 5-7 illustrates object modeling processes according to various embodiments of the invention.
Figure 6:
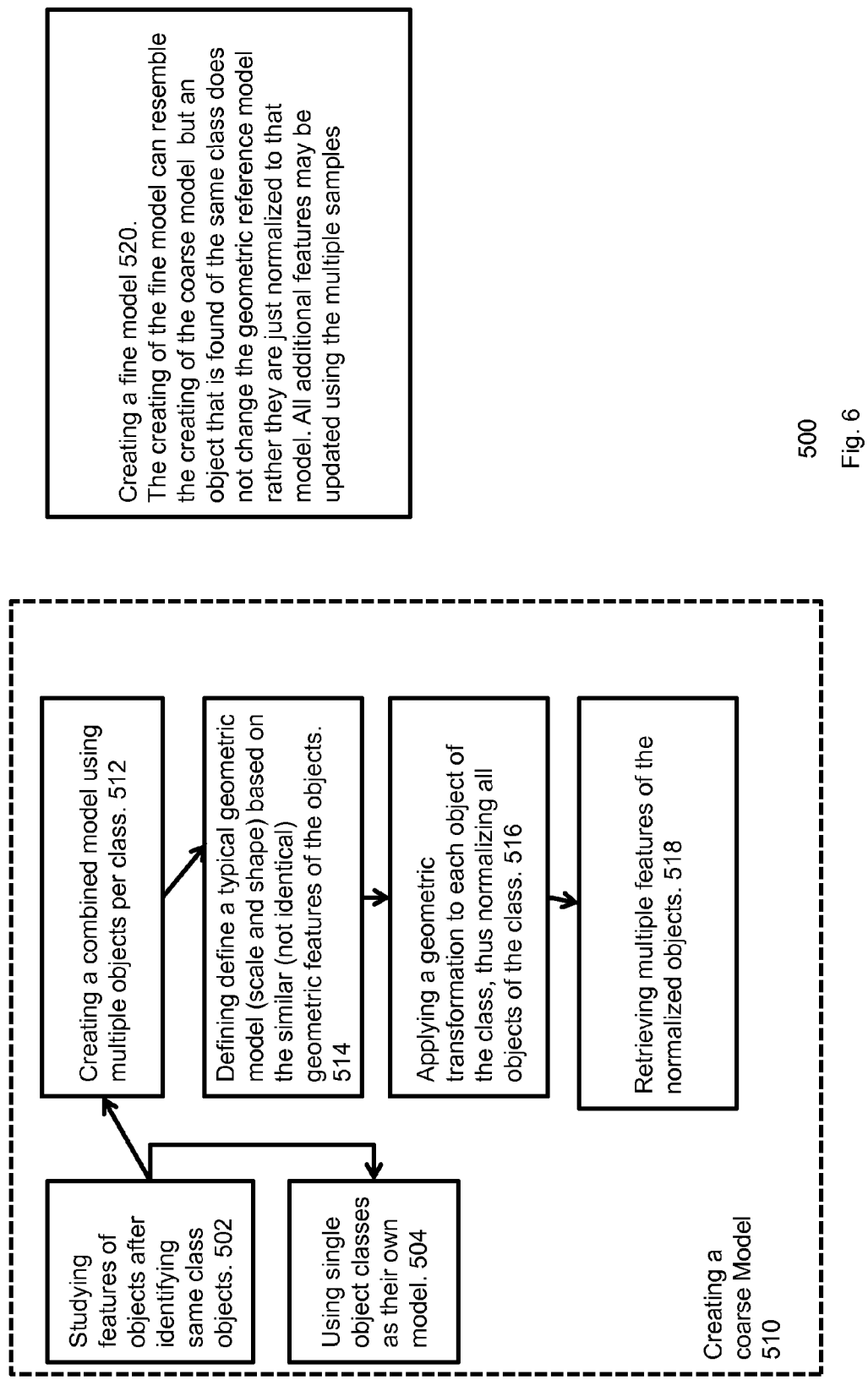

Some detailed examples of the modeling 310 are provided in FIGS. 4-6.

During setup, full or part of wafer images (depends on the specific application) are obtained (312) using multiple imaging modes—using different image obtaining conditions. An image obtaining condition can be an illumination condition, a light collection condition or a combination thereof. For example, images can be obtained using various optical setups such as bright field, dark field, using polarization in an imaging path, using polarization in illumination path, using different cameras, obtaining images of different resolutions, obtaining images of different spectral ranges, using different types of illumination, and the like.

Multiple wafers can be imaged during stage 213 to create good wafer statistics.

According to an embodiment of the invention the modeling 310 may include generating at least one of the following models—wafer models, die models and object models. This is illustrated in FIG. 4.

Wafer models (420) may be created for each of the imaging modes. The wafer models may include:
a. Wafer macro model (422) to be used later for large defects detection (referred to as "Macro Wafer Inspection"). and
b. Local adaptation rules (424) used for modification of die models and object class models as well as inspection rules for these models (algorithms, algorithm parameters, illumination, and the like) across the wafer to comply with legitimate variations across the wafer.

A wafer model may include a partial wafer model.

Die models (430). A die model can be generated for each pixel and for each imaging mode (or for at least some of the imaging modes).

The die model may include at least one of the following parameters: (a) gray level statistics such as Typical, Minimum and Maximal gray level values, (b) local neighborhood gradients (both strength and direction) of various orders, scales and types, (c) neighborhood texture characterization, (d) super resolved images.

Super resolved images or high resolution images are images that have a higher (enhanced) resolution (amount of information it holds per area) relative to a resolution of the acquiring device (camera and optics). A high resolution image can be obtained in various manners such as but not limited to combining a number of low-res images or by adding information based on some learning set which has samples with pairs of high res patches with their low res version or by completing the missing information by looking for similar regions in the image itself). A high resolution image can reduce aliasing and enhance edge information. These super resolved images may be created using multiple scans of lower resolution, each scan shifted by partial pixel relative to the other.

It is noted that repeating features resolution may be enhanced by using multiple images of similar features grabbed during the same scan.

Object class models (440) are also referred to as object models. Object class models are used to describe single\multiple object belonging to given class. For imaging mode, each object class model may include, among other parameters, at least one of the following: (a) 2D reference patch images (a sample image of the entire object and\or sample patches of examples of textures), (b) 3D reference patch images, (c) texture characteristics, (d) relative location of the each object of the class with regard to some reference framework, (e) orientation of the each object of the class, (f) 2D scale, (g) 3D scale, (h) statistical variability of all above parameters.

Typical objects may be, for example, solder bumps, gold bumps and pads, but may include any geometrically definable object.

Die, wafer and object class models may also include of artificially generated vector data describing the model characteristics in order to reduce data volume and allow for scaling/scale changes with smaller interpolation error.

FIG. 5 illustrates a definition phase 450 that is followed by a modeling phase 450.

The definition phase 450 may include creating (452) a representation of the region of interest (ROI) to serve as a reference framework.

The creating is followed by identifying (454) object classes (or receiving classification of objects), object class includes similar class objects and creating a coarse model.

Objects may be any definable object. The objects may vary to some extent across the wafer/wafers with regards to geometric features (transformation). Examples of object classes may include solder bumps, pads, gold bumps.

Stage 454 of the definition phase 450 may be followed by stage 462 of the modeling phase 460. Stage 462 includes scanning one and preferably many examples of the ROI (entire wafer, lot, etc').

Stage 462 is followed by stage 464 of finding, for each frame, a relevant part of objects as defined by the object classes relative to the ROI reference framework and gathering data regarding that class.

Stage 464 is followed by stage 466 of creating a finer model for that class, consolidating the characteristics of the same feature from multiple samples.

Stage 466 is followed by stage 468 (also of the modeling phase 460) of storing multi feature model (a multi-level model) of the class as well as the initial expected positions of objects of that class relative to the reference framework.

FIG. 6 illustrates stage 510 of creating a coarse model and stage 520 of creating a finer model.

Stage 510 may include stages 502, 504, 512, 516 and 518. Stage 502 is followed by stage 504 and 512. Stage 512 starts a sequence of stages that includes stages 512, 514, 516 and 518.

Stage 502 includes studying features of objects after identifying same class objects.

Stage 504 includes using single object classes as their own model. For example—if there is only one object, (such as a rectangular pad) in the die, then at first stage the process may use the initial grabbed images of the die to extract information about this single object in the die. Afterwards the process can use other dice to increase the amount of information on the object (as described before—like size variance, location stability, edge information, etc').

Stage 512 includes creating a combined model using multiple objects per class.

Stage 514 includes defining define a typical geometric model (scale and shape) based on the similar (not identical) geometric features of the objects.

Stage 516 includes applying a geometric transformation to each object of the class, thus normalizing all objects of the class.

Stage 518 includes retrieving multiple features of the normalized objects.

Stage 520 of creating a fine model may be equivalent to stage 510 but may differ from it (stage 510) by that an object that is found of the same class does not change the geometric reference model rather it is normalized to that model.

For example—a model can be built of some object to provide a multi leveled reference for it. Then, more information about this object can be received and more samples of that object can be scanned. Instead of continuously changing the geometry of the reference object (like size and position) information may be gathered from the new samples and "cast" them onto our model and add details to the model. This is because the geometry continues to change the common ground that is provided by the reference can be lost. All additional features may be updated using the multiple samples.

According to various embodiments of the invention features may be: (a) geometric information including variability information of scale, orientation, and the like, (b) texture description/pattern description—may be parametric, may be a sample patch (image), (c) super resolved by multiple samples, (d) multiple variations relating to different scales (including according to height information), different positions on the wafer, etc'. Each feature may include a statistical description that includes information about the distribution/variability of that feature.

The consolidation method of characteristics of a feature from multiple samples may differ according to the feature and may use methods for outlier removal.

Figure 7:
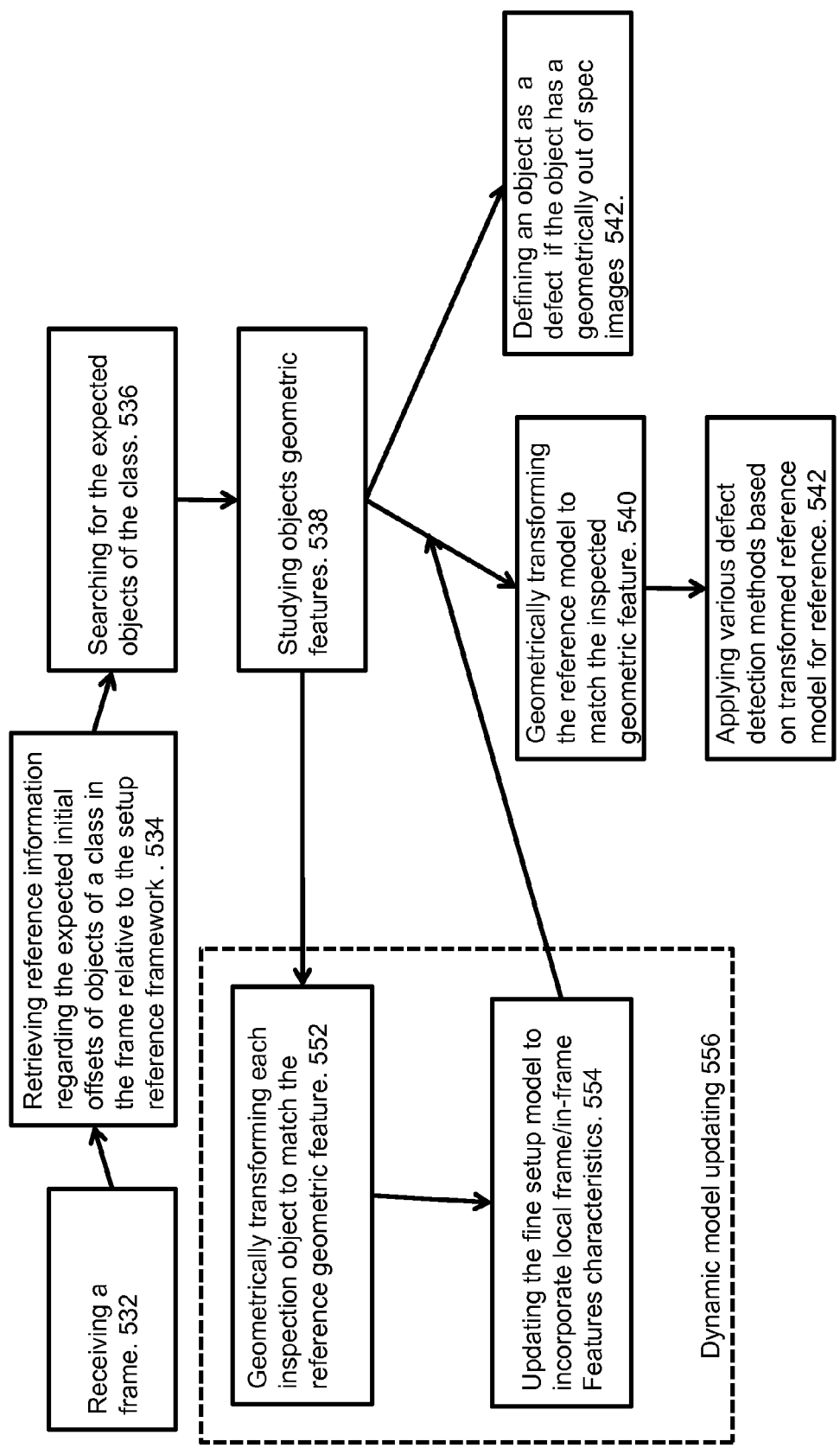

FIG. 7 illustrates stage 532 that is followed by stage 534, stage 534 that is followed by stage 536, stage 526 that is followed by stage 538, stage 538 that is followed by stages 552, 540 and 542, stage 552 that is followed by stage 554 (and both stages 552 and 554 belong to stage 556 of dynamic model updating), stages 540 and 542 that follow stage 556, and stage 542 that follows stage 540.

Stage 532 includes receiving a frame.

Stage 534 includes retrieving reference information regarding the expected initial offsets of objects of a class in the frame relative to the setup reference framework.

Stage 536 includes searching for the expected objects of the class.

Stage 538 includes studying objects geometric features.

Stage 540 includes geometrically transforming the reference model to match the inspected geometric feature.

Stage 542 includes defining an object as a defect if the object has a geometrically out of spec images.

Stage 552 includes geometrically transforming each inspection object to match the reference geometric feature. Stage 554 includes updating the fine setup model to incorporate local frame/in-frame features characteristics.

Zoning

According to an embodiment of the invention the wafer is virtually partitioned to zones. Zones may include system zones and application zones.

System zones may be used to optimize the detection based on the physical characteristics of the inspected pattern, which determines the algorithms and optical setup to be used by the system.

Application zones may be used to optimize detection based on the DOI (defects of interest) typical to each application zone. An inspection recipe can take into account the application zone and find a matching algorithm, image obtaining conditions to find the defect of interest.

The system zones may be determined automatically based on the wafer model, die model, object model or a combination thereof.

Figure 8:
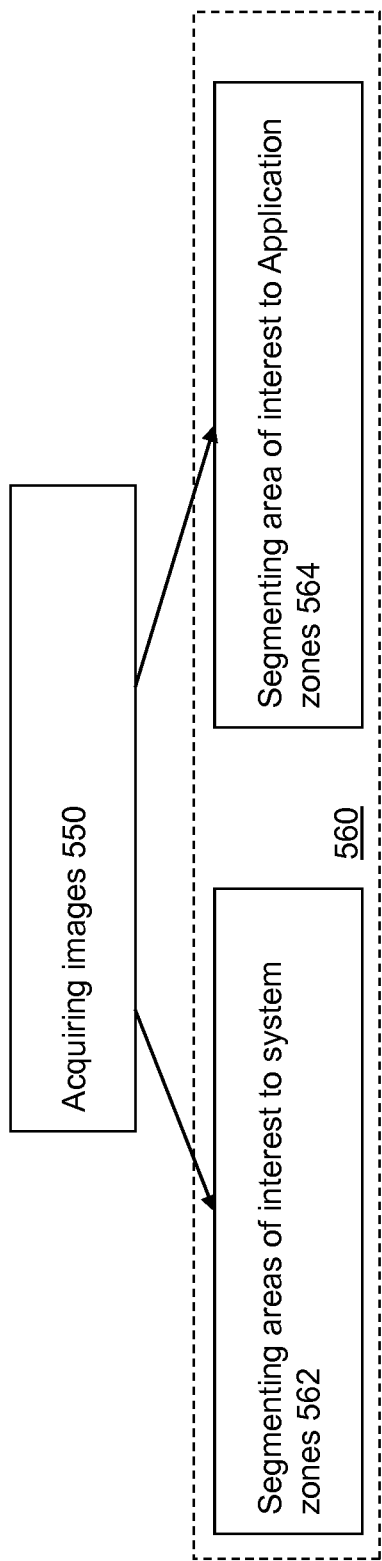
FIG. 8 illustrates a segmentation to system zones and application zones according to an embodiment of the invention.

Referring to FIG. 8—a stage of acquiring images of a wafer (550) is followed by segmenting a wafer (or areas of interest of the wafer) to system zones (562) and to application zones (564).

As indicated above, system zone information is related to the optimal optical and algorithmic setup to be used by the system during inspection.

Application zone information is related to the DOI (defect of interest) typical to a specific zone such as geometric specification i.e. upper and lower limits, and detection sensitivity. The application zones may be created either manually or automatically using an application knowledge base.

Referring back to FIG. 3, during an inspection stage 340, the partition to zones can be altered 370 and models can be adjusted to the outcome of the inspection. The adjustment of zones may be referred to as dynamic zoning. The dynamic zoning may use run-time images to adapt zones and reference model information based on the specific wafer under inspection. Such adaptations provide, for example, modifications for unstable objects (i.e. legitimate localization shift and scale variation of bumps).

Further analysis can be conducted. The further analysis can include gathering more and more information and then reducing the amount of information needed to do the inspection and specify the specific imaging mode required and the specific details in the multi leveled reference which are to be used for optimal inspection while reducing the amount of processing required.

The further analysis may provide data to be used during inspection and may determine, for example, an imaging mode to be used (360), Wafer/Die/Object class model to be used (350), algorithms to be used for the comparison (380).

It is noted that zoning concept may be applied on the die level as well as on the wafer level.

Multileveled Reference

A multileveled reference according to an embodiment of the invention is illustrates in FIG. 9.

The multileveled reference includes different (N) image obtaining conditions 571-579 ("illumination/imaging modes" collectively denoted 570), that may include different configurations of different sensors, multiple algorithms/run time sets (the run time parameters for the algorithms and the set of algorithms to run) 581-583 and multiple reference information (model information) 590 such as multiple (N) texture/pattern super resolution references, 591-593, size information such as a radius of a bump 594, texture pattern class ID (indicative of class of texture), texture/pattern derived information (edge response distribution—amplitude & direction, gray level distribution, etc'), three dimensional information (height, complete model—like some 3D model of the object) 597.

During inspection a reference set may be associated with an algorithm, run-time parameters and to an illumination/imaging mode to provide optimal defect detection. It is noted that multiple reference sets may be used in parallel in conjunction to multiple algorithms/run time sets. Also more than one imaging modes can be used in parallel, subject to optical hardware limitations.

When a single or a group of reference sets, a single or a group of algorithms and a single or a group of imaging modes are used at a given time, they may vary across the wafer area during scan, as illustrated in FIG. 10.

FIG. 10 illustrates three data collection zones 602, 604 and 606 that differ by size and shape from two data processing zones 612 and 614 and differ by size and shape from two object model zones 622 and 624.

According to an embodiment of the invention a multi-level model can include multiple sub-pixel shifted images of an object—these sub-pixel shifted images can be obtained at a sub-pixel offset from each other. The multi-level model can include sub-pixel shifted images or information about these sub-pixel shifted images, or a combination thereof. During an inspection process an acquired image of an object can be compared to all (or some) sub-pixel shifted images and the best matching sub-pixel shifted image will be elected as the relevant reference image.

Figure 11:
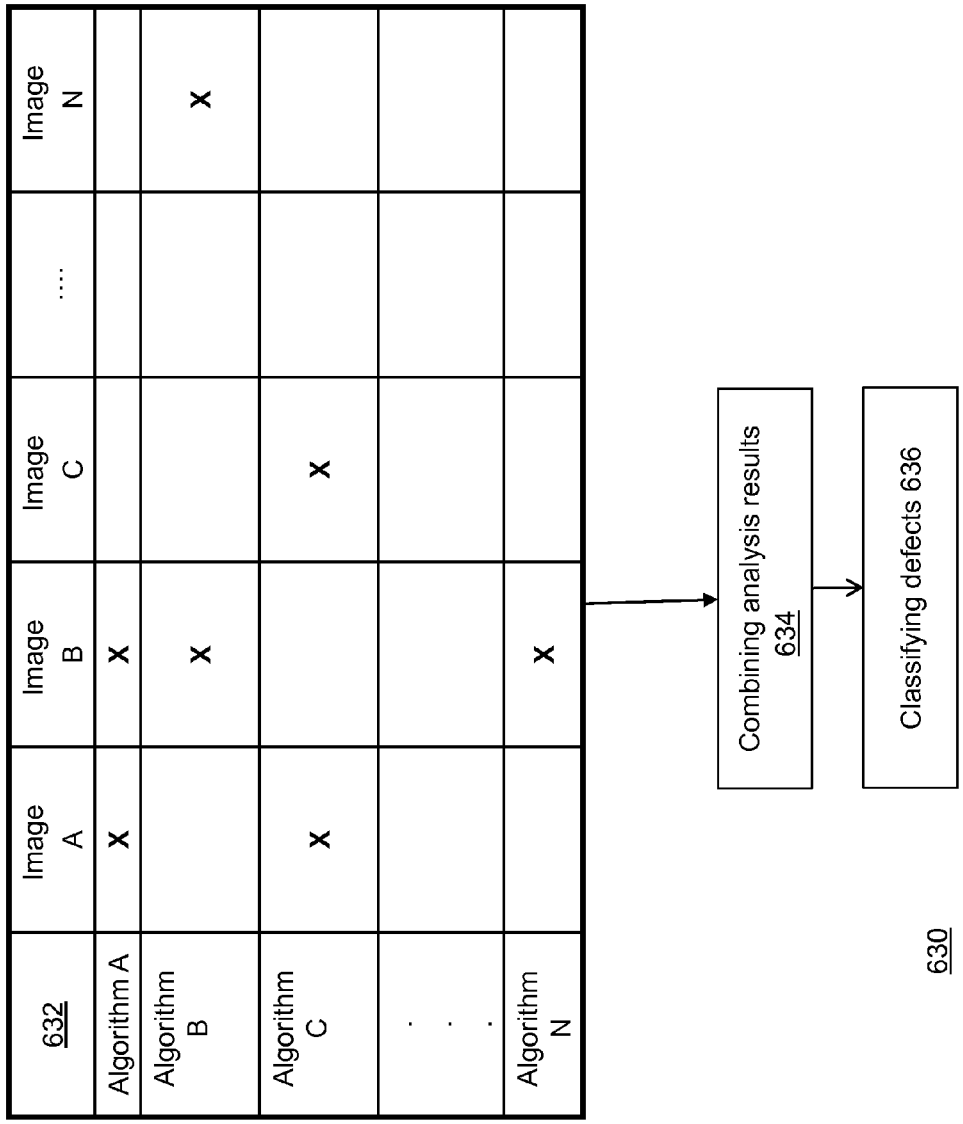
FIGS. 11-13 illustrate processes that involve multiple images, multiple processing algorithms or a combination of both according to an embodiment of the invention.
Figure 12:
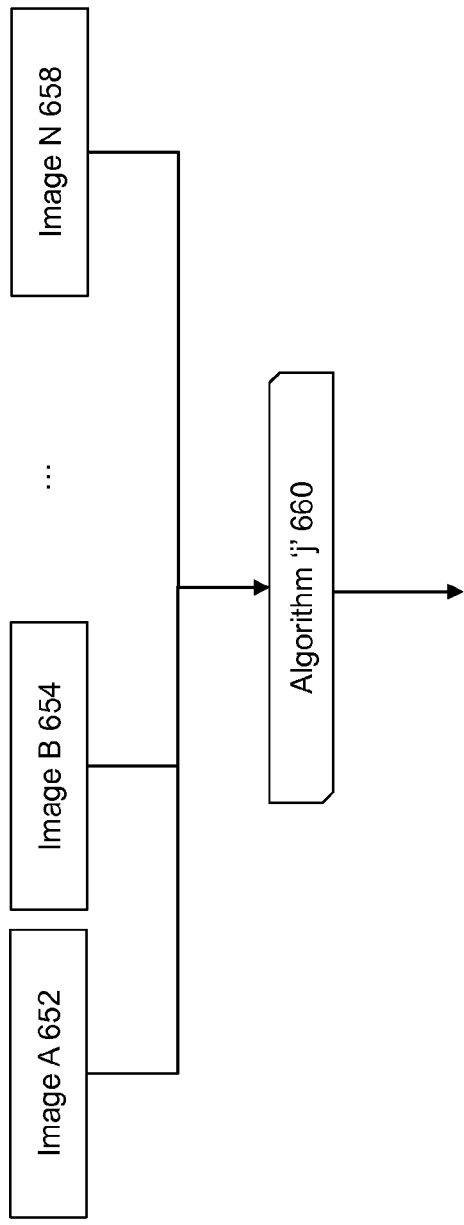
Figure 13:
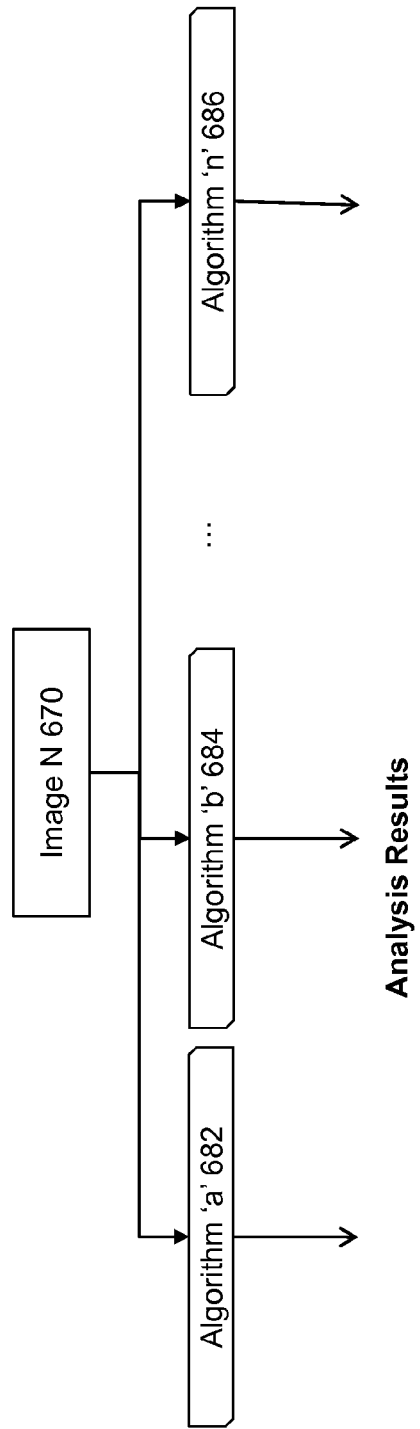

Another feature of the multilevel reference set is explained now with reference to FIGS. 11-13.

During inspection, multiple images, not necessarily having identical size, but covering at least some common region of the inspected article, each with different illumination/optics conditions, may be acquired—simultaneously or sequentially. The images are then compared and analyzed relative to the multileveled reference information gathered/created during setup. The comparison and analysis is done using multiple algorithms, tailored to the specific types of tasks, images and zones.

FIG. 11 demonstrates a use of multiple algorithms and multiple images to generate an initial analysis results—table 632 indicates which images (columns) will be processed ("x") by which algorithms (rows) to provide the initial analysis results. The initial analysis results are then combined (634) to provide combined results that are used to classify defects (636).

Two non limiting possibilities for the generation of initial results are depicted in FIGS. 12-13.

In the option described in FIG. 12 a single algorithm 660 uses multiple (N) images 652-658 to generate a single set of initial results relating to the common covered region of the article. FIG. 13 illustrates multiple algorithms 682-686 that are applied to the same image 670 to generate parallel initial analysis results for that image. Other mixed combinations are possible as well.

As indicated above, in relation to FIG. 11, the initial analysis results can be combined (634), and a list of candidate defects (combined results) can be created to be further classified as a defect and defect class (636). This scheme increases the detection probability while lowering false defect rate. The combining (634) may use linear, non-linear, pre-defined or learned by some supervised or unsupervised functions. The classifying (636) may be manually configured or trained.

Figure 14:
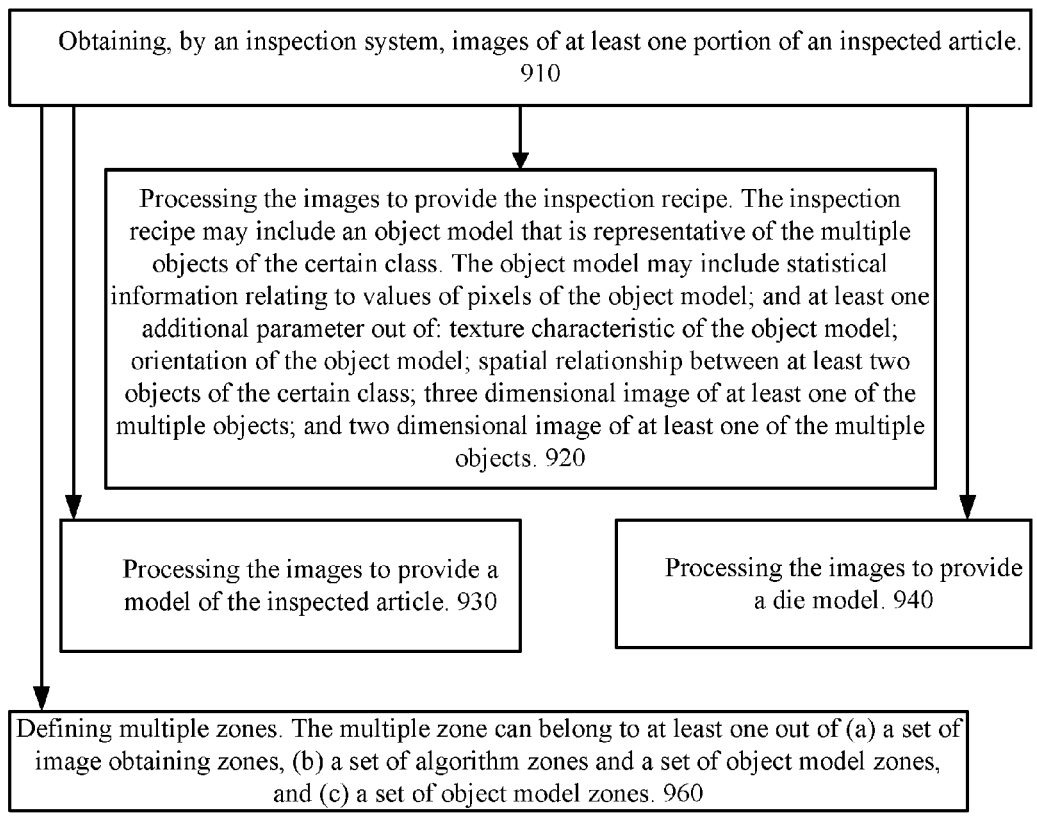

FIG. 14 illustrates a method 900 according to an embodiment of the invention.

Method 900 for generating an inspection recipe may start by stage 910 of obtaining, by a system, images of at least one portion of an inspected article. The inspected article may include multiple objects of a certain class.

Stage 910 may be followed by stage 920 of processing the images to provide the inspection recipe. The inspection recipe may include an object model that is representative of the multiple objects of the certain class. The object model may include statistical information relating to values of pixels of the object model; and at least one additional parameter out of: texture characteristic of the object model; orientation of the object model; spatial relationship between at least two objects of the certain class; three dimensional image of at least one of the multiple objects; and two dimensional image of at least one of the multiple objects.

The object model may include at least two additional parameters, at least two additional parameters or even more of any of the mentioned above additional parameters.

According to an embodiment of the invention the inspected article can include multiple classes of objects. Different classes of objects can differ from each other by size, shape, materials that form the objects or a combination thereof. If the inspected article includes multiple classes of objects then stage 920 can include generating for each class of objects (or for at least two selected classes) an object model. Thus—stage 920 may include processing the images to provide for each class of objects, an object model representative of multiple objects of the class of objects.

The inspected article can include multiple zones. Different zones are located at different locations of the inspected objects. Different zones can have the same size and shape but may differ from each other by size, shape or both. According to an embodiment of the invention an object model can be generated per zone—and it may be generated based on information of objects that are located in that zone.

Accordingly. Stage 920 can include processing the images to provide for each zone out of at least two different zones of the inspected article, an object model representative of the multiple objects of the certain class that are located within the zone of the inspected article.

According to another embodiment of the invention an object model can be generated for each combination of zone and class of objects. Thus, stage 920 can include generating a plurality of object models, herein different object models can differ from each other by at least one of inspected article zone and class of objects.

According to an embodiment of the invention the method can process the images to provided multiple models such as an model of the inspected article, a model of a die (if the inspected article is a wafer).

The generation of additional models is illustrated by stage 930 of processing the images to provide a model of the inspected article and stage 940 of processing the images to provide a die model.

The model of the inspected article can include macro information and local adaptation rules.

The die model can be a model of a die of an inspected article when the inspected article is a wafer. The die model is representative of the multiple dice.

According to an embodiment of the invention stage 910 can include obtaining the images of the at least one portion of the inspected article by applying different image obtaining conditions, wherein an image obtaining comprise at least one of an illumination condition and a light collection condition and stage 920 may include generating multiple object models, wherein different object models are obtained by processing images obtained under different image obtaining conditions.

According to an embodiment of the invention the method can include defining additional inspection recipe information. The additional inspection recipe information can include defining different zones such as but not limited to data collection zones, data processing zones and, additionally or alternatively, object model zones.

Thus, method 900 can include stage 960 of defining multiple zones.

Stage 960 can include defining at least one out of (a) a set of data collection zones, (b) a set of data processing zones and a set of object model zones, and (c) a set of object model zones.

At least two different data collection zones may differ from each other by at least one image obtaining conditions to be applied when obtaining images of the data collection zones.

At least two data processing zones may differ from each other by a processing algorithm to be applied on images of the data processing zones.

The set of data collection zones may differ from the set of the data processing zones.

At least two different object model zones may differ from each other by an object model to be used when processing images of the object model zones.

The set of data collection zones may differ from the set of the data processing zones. The set of data collection zones may differ from the set of object model zones. The set of object model zones may differ from the set of data processing zones.

FIG. 15 illustrates method 1000 of generating an inspection recipe, according to an embodiment of the invention.

Method 1000 may start by stage 1010 of obtaining, by a system, images of at least one portion of an inspected article; wherein the inspected article comprises multiple objects of a certain class.

Stage 1010 may be followed by stage 1020 of processing the images to provide the inspection recipe, wherein the inspection recipe comprises a set of data collection zones and a set of data processing zones. At least two different data collection zones differ from each other by at least one image obtaining conditions to be applied when obtaining images of the data collection zones. At least two data processing zones differ from each other by a processing algorithm to be applied on images of the data processing zones.

The set of data collection zones may differ from the set of the data processing zones. Thus—at least one data collection zone can differ by size and shape from a corresponding data processing zones so that some pixels obtained by applying first image obtaining conditions can be processed by a first algorithm while other pixels obtained of an obtained by applying second image obtaining conditions (that differ from the first image obtaining conditions) can image may be processed by another algorithm—that differs from the first algorithm.

Stage 1020 may include processing the images to provide multiple object models representative of the multiple objects of the certain class; wherein the defining of the inspection recipe comprises defining a set of object model zones; and wherein at least two different object model zones differ from each other by an object model to be used when processing images of the object model zones.

The set of data collection zones differs from the set of the data processing zones and differs from the set of object model zones.

Figure 16:
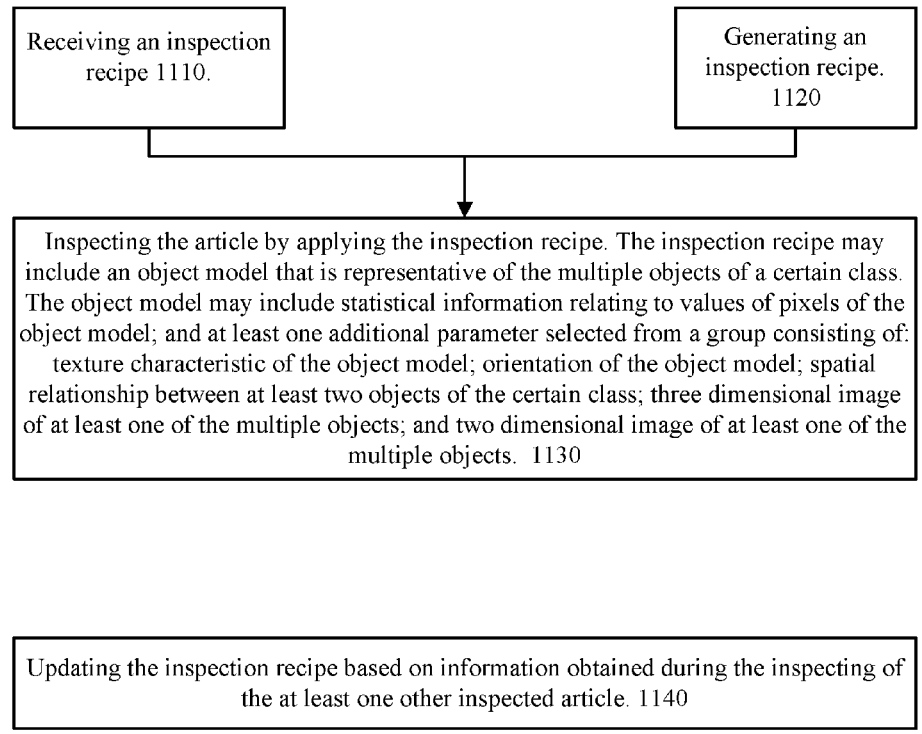

FIG. 16 illustrates a method 1100 for inspecting an article, according to an embodiment of the invention.

Method 1100 may include stage 1110 of receiving an inspection recipe or stage 1120 of generating an inspection recipe. The inspection recipe can be generated by using any one of methods 900 and 100 or a combination thereof.

Stage 1110 and 1120 can be followed by stage 1130 of inspecting the article by applying the inspection recipe. The inspection recipe may include an object model that is representative of the multiple objects of a certain class. The object model may include statistical information relating to values of pixels of the object model; and at least one additional parameter selected from a group consisting of: texture characteristic of the object model; orientation of the object model; spatial relationship between at least two objects of the certain class; three dimensional image of at least one of the multiple objects; and two dimensional image of at least one of the multiple objects.

Method 1100 may also include stage 1140 of updating the inspection recipe based on information obtained during the inspecting of the at least one other inspected article.

The inspecting recipe may include a definition of a set of data collection zones and a set of data processing zones. Accordingly, stage 1130 may include obtaining images by applying image obtaining conditions defined by the set of data collection zones and processing images by algorithms defined by the set of data processing zones.

Figure 17:
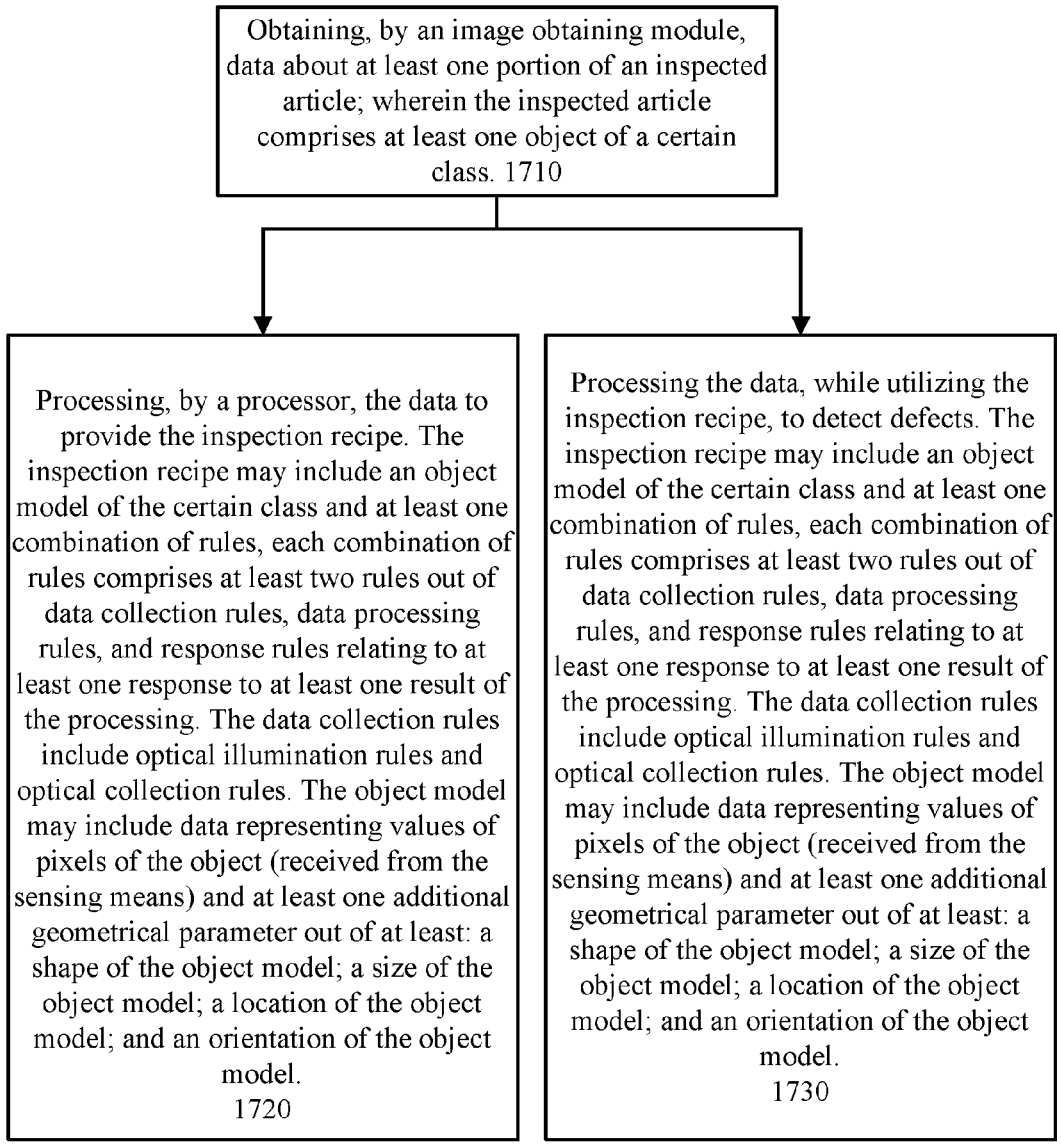

FIG. 17 illustrates method 1700 according to an embodiment of the invention. FIG. 19 illustrates stages 1721-1729 of stage 1720 of method 1700 according to an embodiment of the invention.

Method 1700 starts by stage 1710 of obtaining, by an data obtaining module, data about at least one portion of an inspected article; wherein the inspected article comprises at least one object of a certain class.

Stage 1710 may be followed by one or more of stages 1720 and 1730.

Stage 1720 includes processing, by a processor, the data to provide the inspection recipe. Stage 1730 includes processing the data, while utilizing the inspection recipe, to detect defects.

For both stage (stage 1720 and 1730) inspection recipe includes an object model of the certain class.

The object model may include data representing values of pixels of the object (received from the sensing means) and at least one additional geometrical parameter out of at least: a shape of the object model; a size of the object model; a location of the object model; and an orientation of the object model.

The inspection recipe can include at least one combination of rules, each combination of rules comprises at least two rules out of data collection rules, data processing rules, and response rules relating to at least one response to at least one result of the processing. The data collection rules include optical illumination rules and optical collection rules.

According to an embodiment of the invention the object model may include at least two additional parameters out of: an orientation of the object model; a spatial relationship between at least two objects of the certain class; a three dimensional image of an object of the certain class; and two dimensional image of an object of the certain class.

Stage 1720 may include processing (1721) the data about the at least one portion to provide for each class of objects out of multiple classes of objects, an object model representative of multiple objects of the class of objects.

Stage 1270 may include processing (1722) the images to provide for each area out of at least two different areas of the inspected article, an object model representative of the multiple objects of the certain class that are located within the area of the inspected article.

The at least portion of the inspected article may be the inspected article in its entirety. And stage 1720 may include processing (1723) the data about the at least one portion of the inspected article to provide a model of the inspected article. The model of the inspected article may include macro information and local adaptation rules.

The inspected article may be a wafer that may include multiple dice, wherein each dice of the multiple dice may include multiple objects of the certain class; and wherein stage 1720 may include processing (1724) the images to provide a die model representative of the multiple dice. The method may include obtaining the data by applying different combinations of rules.

Stage 1720 may include generating (1725) multiple object models, wherein different object models are obtained by applying different combinations of rules.

Stage 1720 may include applying (1726) different combinations of rules on same locations of the at least portion of the inspected article.

The inspection recipe may define multiple zones of multiple types of zones; wherein at least one zone of a first type and at least one other zone of a second type of zones partially overlap; wherein the types of zones may include at least two out of a data collection zone, a data processing zone, and a response zone; wherein different data collection zones differ from each other by at least one data collection rule; wherein different data processing zones differ from each other by at least one data processing rule; and wherein different response zones differ from each other by at least one response rule.

A zone of a first type and a zone of a second type of zones partially overlap if the overlap between these zones differs from at least one of zone of the first type and the zone of the second type.

The types of zones may include the data collection zone the data processing zone, and the response zone.

The types of zones may include the data collection zone and the data processing zone.

At least two data processing zones may differ from each other by a data processing rule that defines an object model to be utilized during the processing of the data.

The method may include obtaining (stage 1711) the data about the at least one portion of the inspected article by performing multiple iterations of data obtaining that differ from each other by combination of rules applied during the multiple iterations; and defining (stage 1727) different zones of different types of zones based on the data; wherein the types of zones may include at least one of data collection zone and a data processing zone. Accordingly—a definition of zones can be done automatically—based on the different outcome of different data iterations. For example—if a first area (or defects of that area) is best viewed when applying a first combination of rules and a second area (or defects of that area) are best viewed when applying a second combination of rules then the first area can be defined as a zone in which the first combination of rules should be applied and the second area should be viewed as another zone in which the second combination of rules is applied.

Stage 1720 can include defining (1728) the different zones based on a quality of data obtained at different locations of the at least portion of the inspected article. The quality of data can refer to the clarity in which defects can be seen (for example—shaper defect—surrounding contrast), whether the sensor is saturated or not, and the like.

Stage 1720 may include defining (1729) the different zones based on differences between data obtained at different combinations of rules at different locations of the at least portion of the inspected article.

Figure 18:
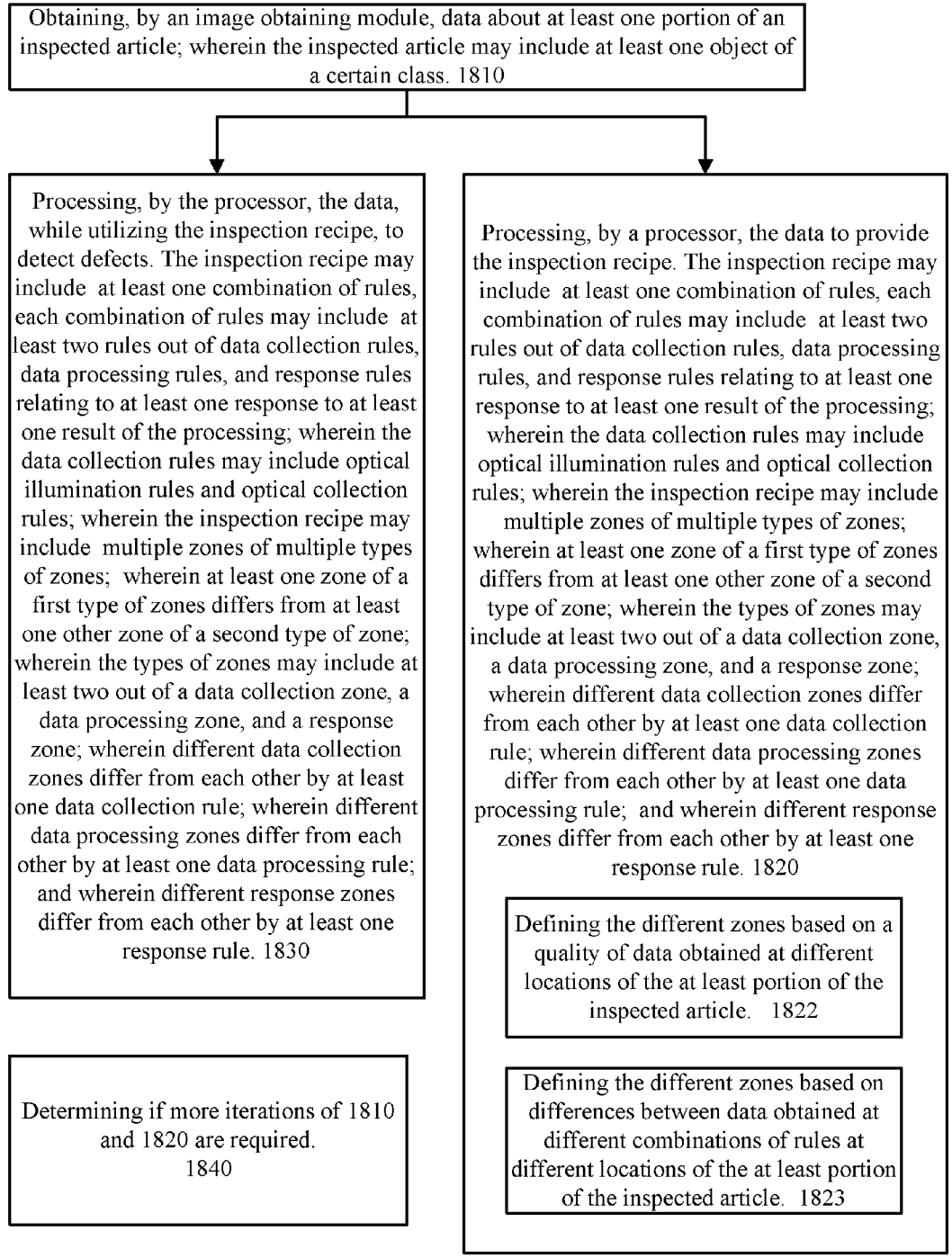

FIG. 18 illustrates method 1800 according to an embodiment of the invention.

Method 1800 may start by stage 1810 of obtaining, by a data obtaining module, data about at least one portion of an inspected article; wherein the inspected article may include at least one object of a certain class.

Stage 1810 may be followed by one or more of stages 1820 and 1830.

Stage 1820 includes processing, by a processor, the data to provide the inspection recipe. Stage 1820 includes processing, by the processor, the data, while utilizing the inspection recipe, to detect defects.

In both cases (stage 1810 and 1820) the inspection recipe may include multiple zones of multiple types of zones; wherein at least one zone of a first type and at least one other zone of a second type of zones partially overlap; wherein the types of zones may include at least two out of a data collection zone, a data processing zone, and a response zone; wherein different data collection zones differ from each other by at least one data collection rule; wherein different data processing zones differ from each other by at least one data processing rule; and wherein different response zones differ from each other by at least one response rule.

A zone of a first type and a zone of a second type of zones partially overlap if the overlap between these zones differs from at least one of zone of the first type and the zone of the second type.

The types of zones may include the data collection zone the data processing zone, and the response zone.

The types of zones may include the data collection zone and the data processing zone.

At least two data processing zones may differ from each other by a data processing rule that defines an object model to be utilized during the processing of the data.

The method 1800 may include automatic definition of zones. This can be obtained, for example, by multiple iterations of stage 1810 and 1820. Thus, method 1800 can include obtaining (1810) the data about the at least one portion of the inspected article by performing multiple iterations of data obtaining that differ from each other by combination of rules applied during the multiple iterations; and defining (1820) different zones of different types of zones based on the data; wherein the types of zones may include at least one of data collection zone and a data processing zone. The repetition of stages 1810 and 1820 and the processing of their execution is illustrated by control stage 1840 of determining if more iterations of 1810 and 1820 are required.

Stage 1820 may include defining (1822) the different zones based on a quality of data obtained at different locations of the at least portion of the inspected article.

Stage 1820 may include defining (1823) the different zones based on differences between data obtained at different combinations of rules at different locations of the at least portion of the inspected article.

Any of the mentioned above methods can be executed by a computer that executes instructions stored in a non-transitory computer readable medium such as disk, diskette, tape, integrated circuit, storage device and the like.

We claim:

1. A method for generating or utilizing an inspection recipe, the method comprising:
    obtaining, by a data obtaining module, data about at least one portion of an inspected article; wherein the inspected article comprises at least one object of a certain class; and
    performing, by a processor, at least one processing operation of the data out of:
        (a) processing the data to provide the inspection recipe; and
        (b) processing the data, while utilizing the inspection recipe, to detect defects;
    wherein the inspection recipe comprises an object model that comprises:
        the data representing values of pixels of the object; and
        at least one additional geometrical parameter selected out of at least:
            a shape of the object model;
            a size of the object model;
            a location of the object model; and
            an orientation of the object model;
    wherein the at least one portion of the inspected article is the inspected article in its entirety;
    wherein the method comprises processing the data about the at least one portion of the inspected article to provide a model of the inspected article; wherein the model of the inspected article comprises macro information and local adaptation rules.

2. A method for generating or utilizing an inspection recipe, the method comprising:
    obtaining, by a data obtaining module, data about at least one portion of an inspected article; wherein the inspected article comprises at least one object of a certain class; and
    performing, by a processor, at least one processing operation of the data out of:
        (a) processing the data to provide the inspection recipe; and
        (b) processing the data, while utilizing the inspection recipe, to detect defects;
    wherein the inspection recipe comprises an object model that comprises:
        the data representing values of pixels of the object; and
        at least one additional geometrical parameter selected out of at least:
            a shape of the object model;
            a size of the object model;
            a location of the object model; and
            an orientation of the object model;
    wherein the inspection recipe defines multiple zones of multiple types of zones;
    wherein at least one zone of a first type of zones differs from at least one other zone of a second type of zone;
    wherein the types of zones comprise at least two out of a data collection zone, a data processing zone, and a response zone;
    wherein different data collection zones differ from each other by at least one data collection rule;
    wherein different data processing zones differ from each other by at least one data processing rule; and
    wherein different response zones differ from each other by at least one response rule.

3. The method according to claim 2, wherein the types of zones comprise the data collection zone the data processing zone, and the response zone.

4. The method according to claim 2, wherein the types of zones comprise the data collection zone and the data processing zone.

5. The method according to claim 2, at least two data processing zones differ from each other by a data processing rule that defines an object model to be utilized during the processing of the data.

6. A method for generating or utilizing an inspection recipe, the method comprising:
    obtaining, by a data obtaining module, data about at least one portion of an inspected article; wherein the inspected article comprises at least one object of a certain class; and
    performing, by a processor, at least one processing operation of the data out of:
        (a) processing the data to provide the inspection recipe; and
        (b) processing the data, while utilizing the inspection recipe, to detect defects;
    wherein the inspection recipe comprises an object model that comprises:
        the data representing values of pixels of the object; and
        at least one additional geometrical parameter selected out of at least:
            a shape of the object model;
            a size of the object model;
            a location of the object model; and
            an orientation of the object model;
    obtaining the data about the at least one portion of the inspected article by performing multiple iterations of data obtaining that differ from each other by combination of rules applied during the multiple iterations; and
    defining different zones of different types of zones based on the data; wherein the types of zones comprise at least one of data collection zone and a data processing zone.

7. The method according to claim 6, comprising defining the different zones based on a quality of data obtained at different locations of the at least portion of the inspected article.

8. The method according to claim 6, comprising defining the different zones based on differences between data obtained at different combinations of rules at different locations of the at least portion of the inspected article.

9. The method according to claim 6, wherein the inspection recipe comprises an object model of the certain class and at least one combination of rules, each combination of rules comprises at least two rules out of data collection rules, data processing rules, and response rules relating to at least one response to at least one result of the processing; wherein the data collection rules comprise optical illumination rules and optical collection rules.

10. A method for generating or utilizing an inspection recipe, the method comprising:
obtaining, by a data obtaining module, data about at least one portion of an inspected article; and
performing, by a processor, at least one processing operation of the data out of:
(a) processing the data to provide the inspection recipe;
(b) processing the data, while utilizing the inspection recipe, to detect defects;
wherein the inspection recipe comprises multiple zones of multiple types of zones;
wherein at least one zone of a first type of zones and least one other zone of a second type of zone partially overlap;
wherein the types of zones comprise at least two out of a data collection zone, a data processing zone, and a response zone;
wherein different data collection zones differ from each other by at least one data collection rule;
wherein different data processing zones differ from each other by at least one data processing rule; and
wherein different response zones differ from each other by at least one response rule.

11. The method according to claim 10, wherein the types of zones comprise the data collection zone, the data processing zone and the response zone.

12. The method according to claim 10, wherein the types of zones comprise the data collection zone and the data processing zone.

13. The method according to claim 10, wherein at least two data processing zones differ from each other by a data processing rule that defines an object model to be utilized during the processing of the data.

14. The method according to claim 10, comprising:
obtaining the data about the at least one portion of the inspected article by performing multiple iterations of data obtaining that differ from each other by combination of rules applied during the multiple iterations; and
defining different zones of different types of zones based on the data; wherein the types of zones comprise at least one of data collection zone and a data processing zone.

15. The method according to claim 14, comprising defining the different zones based on a quality of data obtained at different locations of the at least portion of the inspected article.

16. The method according to claim 14, comprising defining the different zones based on differences between data obtained at different combinations of rules at different locations of the at least portion of the inspected article.

17. A non-transitory computer readable medium that stores instructions for causing a computer to perform the following steps:
obtaining, by a data obtaining module, data about at least one portion of an inspected article; wherein the inspected article comprises at least one object of a certain class; and
performing, by a processor, at least one processing operation of the data out of:
(a) processing the data to provide the inspection recipe;
(b) processing the data, while utilizing the inspection recipe, to detect defects;
wherein the inspection recipe comprises multiple zones of multiple types of zones;
wherein at least one zone of a first type of zones and least one other zone of a second type of zone partially overlap;
wherein the types of zones comprise at least two out of a data collection zone, a data processing zone, and a response zone;
wherein different data collection zones differ from each other by at least one data collection rule;
wherein different data processing zones differ from each other by at least one data processing rule; and
wherein different response zones differ from each other by at least one response rule.

18. The non-transitory computer readable medium according to claim 17 wherein the types of zones comprise the data collection zone, the data processing zone and the response zone.

19. The non-transitory computer readable medium according to claim 17, wherein the types of zones comprise the data collection zone and the data processing zone.

20. The non-transitory computer readable medium according to claim 17, wherein at least two data processing zones differ from each other by a data processing rule that defines an object model to be utilized during the processing of the data.

21. The non-transitory computer readable medium according to claim 17, that further stores instructions for causing a computer to perform the steps of:
obtaining the data about the at least one portion of the inspected article by performing multiple iterations of data obtaining that differ from each other by combination of rules applied during the multiple iterations; and
defining different zones of different types of zones based on the data; wherein the types of zones comprise at least one of data collection zone and a data processing zone.

22. The non-transitory computer readable medium according to claim 21, that further stores instructions for causing a computer to perform the step of defining the different zones based on a quality of data obtained at different locations of the at least portion of the inspected article.

23. The non-transitory computer readable medium according to claim 21, that further stores instructions for causing a computer to perform the step of defining the different zones based on differences between data obtained at different combinations of rules at different locations of the at least portion of the inspected article.

24. A system comprising a data obtaining module and a processor;
wherein data obtaining module is arranged to obtain data about at least one portion of an inspected article; wherein the inspected article comprises at least one object of a certain class; and
wherein the processor is arranged to perform at least one processing operation of the data out of:
(a) processing the data to provide the inspection recipe;
(b) processing the data, while utilizing the inspection recipe, to detect defects;
wherein the inspection recipe comprises an object model of the certain class;
wherein the object model comprises:
the data representing values of pixels of the object; and
at least one additional geometrical parameter selected out of at least:
a shape of the object model;
a size of the object model;
a location of the object model; and
an orientation of the object model;
wherein the at least one portion of the inspected article is the inspected article in its entirety;
wherein the processor is further arranged to process the data about the at least one portion of the inspected article to provide a model of the inspected article; wherein the model of the inspected article comprises macro information and local adaptation rules.

25. A system comprising a data obtaining module and a processor;
    wherein data obtaining module is arranged to obtain data about at least one portion of an inspected article;
    wherein the inspected article comprises at least one object of a certain class; and
    wherein the processor is arranged to perform at least one processing operation of the data out of:
        (a) processing the data to provide the inspection recipe;
        (b) processing the data, while utilizing the inspection recipe, to detect defects;
    wherein the inspection recipe comprises multiple zones of multiple types of zones;
    wherein at least one zone of a first type of zones and least one other zone of a second type of zone partially overlap;
    wherein the types of zones comprise at least two out of a data collection zone, a data processing zone, and a response zone;
    wherein different data collection zones differ from each other by at least one data collection rule;
    wherein different data processing zones differ from each other by at least one data processing rule; and
    wherein different response zones differ from each other by at least one response rule.

26. The system according to claim 25, wherein the types of zones comprise the data collection zone, the data processing zone and the response zone.

27. The system according to claim 25, wherein the types of zones comprise the data collection zone and the data processing zone.

28. The system according to claim 25, wherein at least two data processing zones differ from each other by a data processing rule that defines an object model to be utilized during the processing of the data.

29. The system according to claim 25, wherein the data obtaining module is arranged to obtain the data about the at least one portion of the inspected article by performing multiple iterations of data obtaining that differ from each other by combination of rules applied during the multiple iterations; and wherein the system is arranged to define different zones of different types of zones based on the data; wherein the types of zones comprise at least one of data collection zone and a data processing zone.

30. The system according to claim 29, arranged to define the different zones based on a quality of data obtained at different locations of the at least portion of the inspected article.

31. The system according to claim 29, arranged to define the different zones based on differences between data obtained at different combinations of rules at different locations of the at least portion of the inspected article.

32. A system comprising a data obtaining module and a processor;
    wherein data obtaining module is arranged to obtain data about at least one portion of an inspected article; wherein the inspected article comprises at least one object of a certain class; and
    wherein the processor is arranged to perform at least one processing operation of the data out of:
        (a) processing the data to provide the inspection recipe;
        (b) processing the data, while utilizing the inspection recipe, to detect defects;
    wherein the inspection recipe comprises an object model of the certain class;
        wherein the object model comprises:
            the data representing values of pixels of the object; and
            at least one additional geometrical parameter selected out of at least:
                a shape of the object model;
                a size of the object model;
                a location of the object model; and
                an orientation of the object model;
    wherein the inspection recipe defines multiple zones of multiple types of zones;
    wherein at least one zone of a first type of zones differs from at least one other zone of a second type of zone;
    wherein the types of zones comprise at least two out of a data collection zone, a data processing zone, and a response zone;
    wherein different data collection zones differ from each other by at least one data collection rule;
    wherein different data processing zones differ from each other by at least one data processing rule; and
    wherein different response zones differ from each other by at least one response rule.

33. A system comprising a data obtaining module and a processor;
    wherein data obtaining module is arranged to obtain data about at least one portion of an inspected article; wherein the inspected article comprises at least one object of a certain class; and
    wherein the processor is arranged to perform at least one processing operation of the data out of:
        (a) processing the data to provide the inspection recipe;
        (b) processing the data, while utilizing the inspection recipe, to detect defects;
    wherein the inspection recipe comprises an object model of the certain class;
        wherein the object model comprises:
            the data representing values of pixels of the object; and
            at least one additional geometrical parameter selected out of at least:
                a shape of the object model;
                a size of the object model;
                a location of the object model; and
                an orientation of the object model;
    wherein data obtaining module is arranged to obtain the data about the at least one portion of the inspected article by performing multiple iterations of data obtaining that differ from each other by combination of rules applied during the multiple iterations; and
    wherein the system is arranged to define different zones of different types of zones based on the data; wherein the types of zones comprise at least one of data collection zone and a data processing zone.

* * * * *